Patented Aug. 31, 1926.

1,598,052

UNITED STATES PATENT OFFICE.

HERMAN E. S. CHAYES, OF NEW YORK, N. Y., ASSIGNOR, BY MESNE ASSIGNMENTS, TO CHAYES DENTAL INSTRUMENT CORPORATION, OF NEW YORK, N. Y., A CORPORATION OF DELAWARE.

DENTAL MODEL.

Application filed July 16, 1924. Serial No. 726,272.

This invention relates generally to a model for demonstrating dental structure.

A general object of the invention is to provide a device of the general type referred to which can be used for displaying to students of dentistry the form, arrangement and relationship to each other of the human teeth.

The invention includes a pair of frame members representing the upper and the lower jaws and having a flexibly hinged relationship such as will permit the opposing sets of teeth with which the frame members are equipped to be brought into registering contact.

Another feature of the invention resides in the removable mounting of the individual tooth members in cushioned relation to the sockets to provide resilient and yielding seating of the tooth members in the supporting frame members.

Other features of the invention will be hereinafter described.

Figure 1:
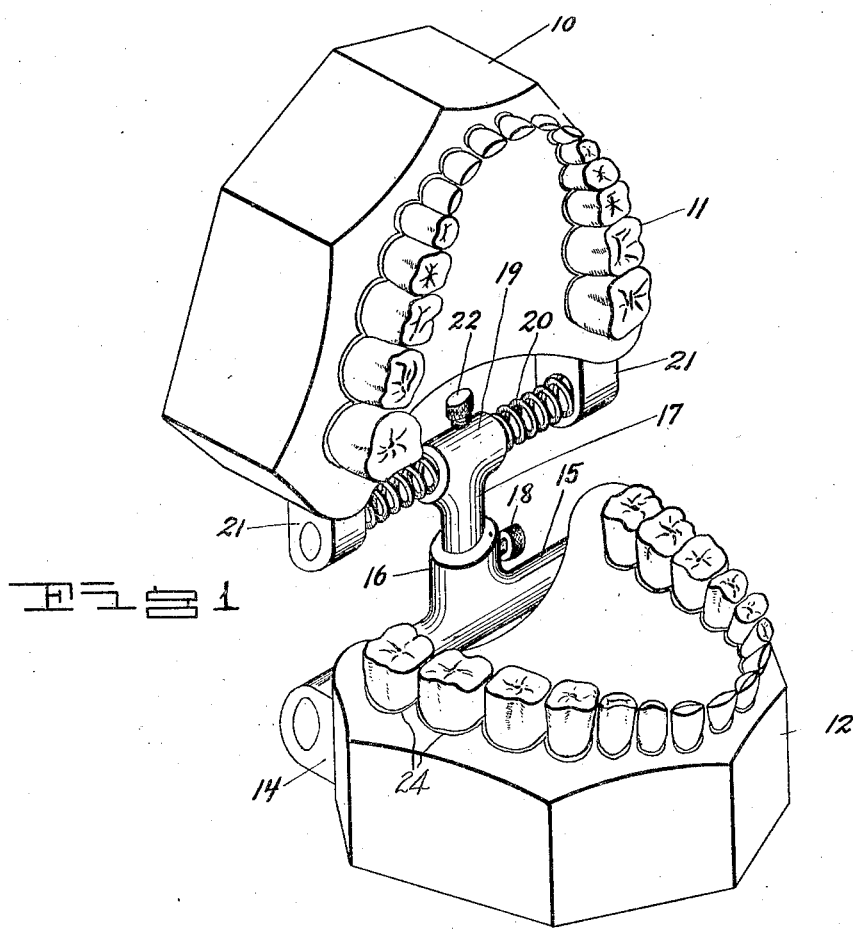
Figure 1 is a perspective view of a dental model embodying the invention.

Referring to the drawings for a more detailed description of the invention, in Figure 1 there is shown a dental model including a frame member 10 representing an upper jaw member equipped with a set of teeth 11 and a frame member 12 representing a lower jaw member equipped with a set of teeth 13.

The frame members 10 and 12 have a flexibly hinged relationship to each other which is designed to simulate the actual relationship of the human jaw members to each other. This is accomplished by providing the lower frame member 12 with rearwardly projecting studs 14 in which is mounted a horizontally extending rod member 15 provided at an intermediate portion with upstanding socket members 16. The socket member 16 is designed to receive an upper jaw supporting member 17 which is held in the socket 16 in any desired angular position of adjustment by means of the set screw 18.

The supporting member 17 is provided with a horizontally extending tubular portion 19 which supports a resilient helically coiled spring member 20 whose opposite ends are seated in rearwardly extending lugs 21 formed on the upper frame member 10. This construction provides a resilient and hinged connection between the upper and lower frame members 10 and 12 through which the registration and engagement of the upper and lower sets of teeth 11 and 13 can be readily accomplished. Longitudinal movement of the spring member 20 in the seat 19 can be prevented or the longitudinal position of the spring 20 adjusted in the seat through the use of a set screw 22.

It will be seen that by the flexible connection thus provided the mutually contacting portions of the tooth members can be brought into fitting and registering relation in much the same way that the registration of actual teeth or of artificial teeth in the human jaws can be accomplished through the flexible relationship between the jaws which is actually provided in nature.

Another feature of the invention resides in a removable and cushioned mounting of the individual tooth members in the supporting frame members. This is achieved by mounting the individual tooth members in inwardly converging sockets 23, the side walls of which are provided with cushioning members 24 formed of rubber or like material. This results in a structure which again corresponds to that found in nature in that the tooth members are cushioned in their seats so that they yield under pressure or shock produced by the bringing of the opposite sets of teeth together. In addition a cushioned seating of the teeth assists in the bringing of the faces of the opposite sets of teeth into uniform mutual contact and also permits the ready removal of teeth from the sockets as well as the resetting of the teeth therein for demonstration purposes.

Figure 2:
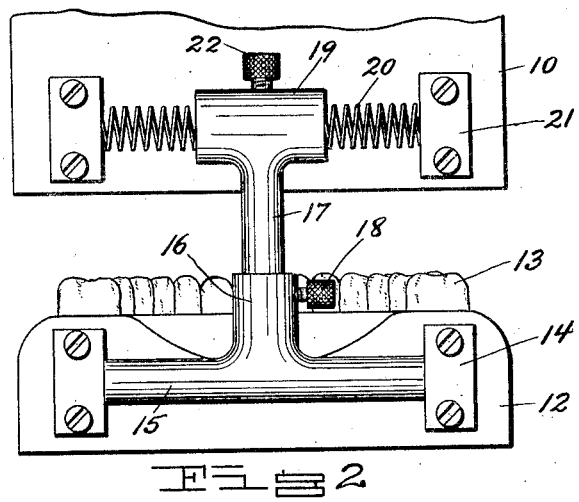
Figure 2 is a view in rear elevation of the device shown in Figure 1.
Figure 3:
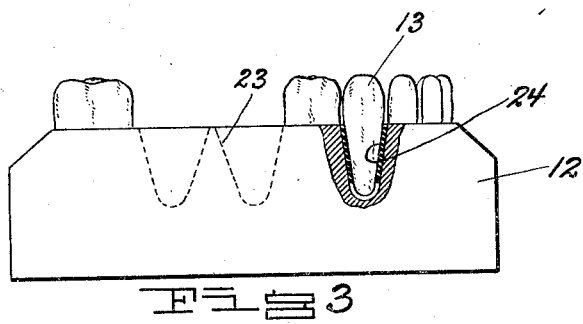
Figure 3 is a view in side elevation of part of the device shown in Figure 1 with a detail shown in section.
Figure 4:
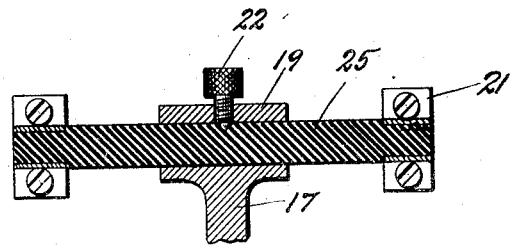
Figure 4 is a sectional view showing a modified form of support for one of the jaw members shown in Figure 1.

In Figure 4 of the drawing is shown a modified form of a resilient mounting for the upper frame member 10. This consists of a rod or bar 25 formed of rubber or like material instead of the spring 20 which is shown in Figures 1 and 2 of the drawing.

What is claimed is:—

1. In a dental model, a pair of tooth-carrying jaw members, and a spring member forming a hinge between said jaw members.

2. In a dental model, a pair of tooth-carrying jaw members, and a resilient member forming a hinge between said jaw members.

3. In a dental model, a pair of tooth-carrying jaw members, a support adjustably mounted on one of said jaws, a resilient member adjustably mounted in said support, the other jaw being carried by said resilient member.

4. In a dental model, a pair of tooth-carrying jaw members, a standard rising from the rearmost portion of the lower jaw member, a transversely extending resilient member supported by said standard, and the upper jaw member being supported by the resilient member at a point spaced from the point of engagement of the member with said standard.

5. In a dental model, a pair of tooth-carrying jaw members, a standard rising from the rearmost portion of the lower jaw member, a transversely extending spring member supported at a mid portion by said standard, and the upper jaw member being supported by the opposite ends of the spring member.

6. In a dental model, a pair of tooth-carrying jaw members, a standard rising from the rearmost mid portion of the lower jaw member, said standard being angularly adjustable about its axis, a transversely extending helically coiled spring member supported at a mid portion by said standard, and the upper jaw member being supported by the opposite ends of the spring member.

7. In a dental model, a tooth member, and a support therefor including a socket having a cushioning lining therein.

8. In a dental model, a tooth member, a support for the tooth member provided with an inwardly converging socket, and a sheet lining for the side walls of the socket formed of cushioning and resilient material.

9. In a dental model, a pair of jaw members, a resilient hinged connection for the jaw members including means for providing angular lateral adjustment thereof, and removable tooth members resiliently seated in the jaw members.

In testimony whereof I affix my signature.

HERMAN E. S. CHAYES.